United States Patent [19]

Olivo et al.

[11] 4,116,921

[45] Sep. 26, 1978

[54] NOVEL THERMOSETTING MOLDING COMPOSITION

[75] Inventors: Anthony Robert Olivo, Neshanic Station, N.J.; Anthony Constantine Soldatos, Geneva, Switzerland; Sidney Joseph Schultz, Cranford, N.J.

[73] Assignee: Union Carbide Corporation, New York, N.Y.

[21] Appl. No.: 757,061

[22] Filed: Jan. 5, 1977

Related U.S. Application Data

[63] Continuation-in-part of Ser. No. 499,933, Aug. 23, 1974, abandoned, which is a continuation of Ser. No. 307,628, Nov. 17, 1972, abandoned.

[51] Int. Cl.$^2$ .............................................. C08G 8/20
[52] U.S. Cl. ................................... 260/38; 528/137; 528/140; 528/153
[58] Field of Search .............................. 260/51 R, 38

[56] References Cited

U.S. PATENT DOCUMENTS

| 1,614,172 | 1/1927 | Amann | 260/51 R |
|---|---|---|---|
| 3,640,958 | 2/1972 | Soldatos | 260/59 |
| 3,763,104 | 10/1973 | Buchanan | 260/60 |

FOREIGN PATENT DOCUMENTS 402,911 12/1965 Australia.

*Primary Examiner*—Sandra M. Person
*Attorney, Agent, or Firm*—Franklyn Schoenberg

[57] ABSTRACT

There is described a new "one-step" bis A-formaldehyde resin, and a molding material containing the resin with which one may achieve molded products possessing excellent properties and almost optimum molding characteristics such as excellent molding latitude, low degree of mold shrinkage, high modulus at elevated temperature, a low degree of deformation at elevated temperatures, and excellent steam crack resistance and electrical properties. The molding material comprises a light colored bis-A formaldehyde resin and reinforcing filler for the resin. The resin is a heat convertible resin (resole) which comprises the product of the reaction of formaldehyde and bis A in the mole ratio of about 2 to about 3.75, in the presence of a catalytic amount of an alkali metal hydroxide or barium hydroxide condensation catalyst. The molding material of this invention is particularly desirable in making molded products by the injection molding or transfer molding processes.

4 Claims, 1 Drawing Figure

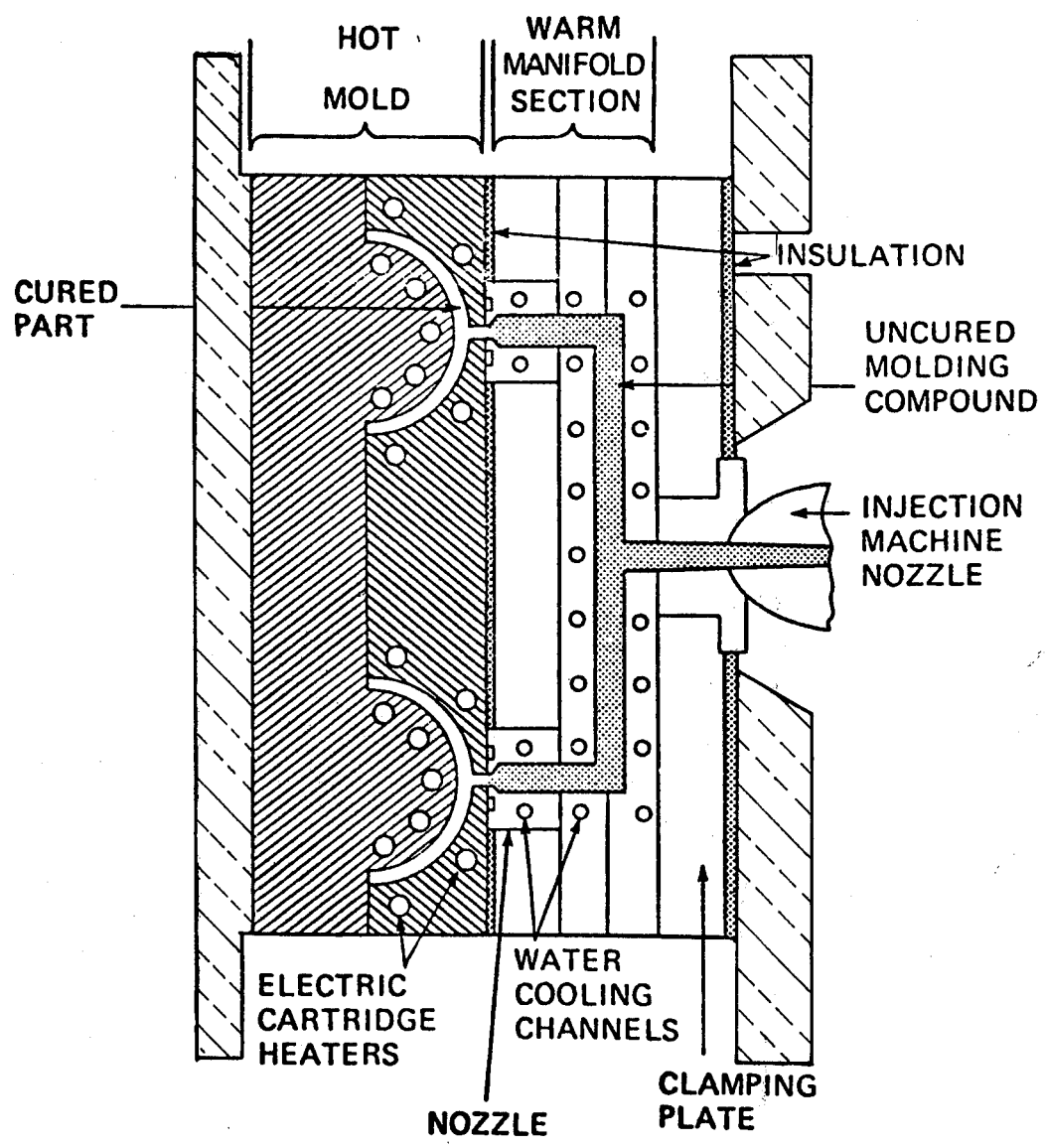

NOVEL THERMOSETTING MOLDING COMPOSITION

This application is a continuation-in-part of our copending application Ser. No. 499,933, filed Aug. 23, 1974, now abandoned which is a continuation of our application Ser. No. 307,628, filed Nov. 17, 1972, now abandoned.

This invention is concerned with the manufacture of thermosetting molding compositions, methods for using them, and novel resins to be employed in the molding compositions. More particularly this invention is concerned with thermosetting molding compositions which contain resins that can be heat cured in "one-step," i.e., cured without the addition of curing or crosslinking agents, and which possess a combination of unique characteristics making them most desirable for use in injection molding processes, as well as for transfer and compression molding processes.

The molding arts have long desired a "one-step" curing thermosetting resin which can be compounded into a molding material or compound having or producing the following characteristics and/or results:

1. An initial light color and the ability to be pigmented to pastel shades.
2. Good color stability even when heated and exposed to ultraviolet (UV) light.
3. Excellent molding properties such as:
   (a) The ability to sufficiently maintain plasticity and flow characteristics while residing in warm runner molds, at about 120° C., which are used in many injection molding apparatus.
   (b) Have the ability to rapidly cure in the mold when brought to a selected molding temperature; and
   (c) Possess the appropriate fluidity in the mold such that it will fill the mold so as to preclude formation of voids and allow the fabrication of intricately shaped articles.
4. Minimum shrinkage during curing in the mold and after aging at ambient room temperature (e.g., 20°–25° C.).
5. The molded article should be very rigid and retain its shape at elevated temperatures so that the article can be withdrawn from the mold while hot. This avoids the time consuming need to cool the mold before withdrawing the article. This characteristic is technically called "hot rigidity" or high modulus at elevated temperatures.
6. The shaped molded article should possess a low degree of deformation at high temperatures, e.g., over 200° C.
7. Since molded articles made from compounded thermosetting resins are supposed to be heat resistant they should also possess the ability to withstand stresses induced by humidity and temperature differentials across the walls of the articles. This may be defined as a high steam crack resistance and articles possessing such can be used in appliances which are expected to be exposed to heat and steam, for example, iron handles.
8. Since thermosetting resins are frequently used in making molded articles used in electrical and electronic applications, excellent electrical properties are most desirable.

The molder has a number of "one-step" thermosetting resins which he can use in making useful molding materials and the question presented is whether any of them when properly compounded, provide a molding material which can eventually satisfy all of the desirable criteria recited above.

First, there are the "one-step" phenol-formaldehyde resin containing molding materials. They fail to meet a number of the criteria, for example:

1. They possess a dark initial color and cannot be pigmented to pastel shades;
2. They possess poor color stability when heated and/or exposed to UV light;
3. They are viscosity sensitive at elevated temperatures and increase in viscosity too rapidly when held in warm runners, as used in injection molding, and when the viscosity or flow is adjusted by reformulation of the material, a loss of hot rigidity in the molded article occurs;
4. They shrink to an undesirable extent though they are better in this property than most other thermosets; and
5. The steam crack resistance of a phenolic molding material having good molding latitude is not adequate.

Therefore, molding materials containing one-step phenol-formaldehyde resins, though desirable, fail to meet very important molding criteria and product requirements.

Next, the molder can compound "one-step" melamine or urea-formaldehyde resins. These molding materials are known to possess good light-color characteristics because the resins are not deficient in this regard. However these molding materials fail in the following respects:

1. The materials have a high degree of shrinkage in the mold and continue to shrink upon aging at room temperature;
2. A melamine or urea molding material which has good molding latitude is deficient in hot rigidity properties; and
3. They possess inferior steam crack resistance.

Polyester resins are popular thermosetting resins but are not "one-step" resins and when compounded in a molding material, the molding material significantly shrinks in the mold and when otherwise exposed to high temperatures. To minimize this deficiency, the molder must add a low profile additive to the material which tends to expand the resin's surface at the mold surface to thereby create an article more closely approximating the mold's capacity and configuration.

There is described herein a molding material containing at least an inert filler which can satisfy, in a superior manner, each of the desirable characteristics 1–8 recited above.

STATEMENT OF THE INVENTION

The molding material of this invention contains about 20 to about 70 weight percent, based on the weight of the material of a light colored resin formed by the reaction of Bisphenol A (hereinafter called Bis-A), chemically known as 2,2-bis(4-hydroxyphenyl)propane, and formaldehyde, and about 30 to about 80 weight percent, based on the weight of the material, of a reinforcing filler for the resin. The resin comprises the product of the reaction of formaldehyde and Bis-A at the mole ratio of about 2 to about 3.75 in the presence of an alkali metal or barium hydroxide condensation catalyst to produce a one-step, heat convertible resin. It has a pH of about 3 to about 8. The reinforcing filler may be a particulate, such as powdery or fibrous, solid which when mixed with the resin and the resin is cured to the solid state, at least one of the following properties for the resin is increased: tensile strength, tensile modulus, Izod impact strength (notched), flexural strength and flexural modulus.

STATE OF THE ART

The first phenolic molding compounds produced by Dr. Leo H. Baekeland in 1910 were compression molded using equipment originally designed for molding rubber. Compression molding, typically with a cavity and a top force or plug section, uses cold powder or heated preforms. Compression molding remains a major method of producing thermoset parts.

The transfer or plunger molding process was later developed. In that process, the preheated molding compound is placed in a separate plunger or well, and then transferred (or injected) into the mold. The process is ideal for molding around inserts and for molding intricate parts or to close tolerances.

Injection molding with reciprocating screw type presses is the most recent advance in the molding of thermosetting materials, an advance that has triggered a resurgence of interest in 60-year old phenolic molding materials as well as other thermosetting molding materials. The in-line reciprocating screw machine has been used for thermoplastics and only more recently modified to handle thermosetting materials. Basically, the machine conveys the molding material as a powder from the hopper, heats, melts and plasticizes the material in the screw flights, and then the screw, acting as a ram, injects the material directly into the mold.

Advantages of injection molding on reciprocating screw machines include a high degree of automation and control, elimination of preheated preforms, very fast cure cycles and vertical discharge of the molded part. Molds and equipment are equivalent in cost and complexity of design to those used for transfer molding.

The newly-developed ability to injection mold thermosetting molding materials has led to a reevaluation of the materials being used in many applications of injection molding. Cure cycles for phenolic thermosetting molding materials are frequently shorter than the cooling cycles for engineering thermoplastics, especially in thick or large parts. Molded thermosets are rigid on curing and can be discharged hot from the mold whereas thermoplastics must be cooled in the mold. The costs of producing parts from thermosetting molding materials now compare much more favorably with competing materials. For example, the properties of molded phenolic parts (especially their heat resistance and dimensional stability) stack up well against the properties of parts made from die cast metals. Of course, the heat resistance and dimensional stability of thermosets have always been superior to those of the so-called engineering thermoplastics.

Concurrent with the development of the injection molding process was the development of improved thermosetting molding material, e.g., phenolic molding compounds, which are more suited for the particular requirements of injection molding. Characteristics that were improved include: density and granulation that allow steady feed in both the machine hopper and screw flights, lubricity of the material for better control of frictional heat in the barrel and better mold release, and melt and flow properties which permit the materials to be used on the most critical applications. Unique resin developments have permitted molding compounds to be held in the heated barrel of the injection machine for longer periods of time with little loss of flow. In addition, once the material enters the mold, its high hot rigidity, when combined with the use of hotter molds (in the range of about 175° to 200° C.) yields more distortion-free parts on extremely fast molding cycles.

It is expected that in the next few years, the "warm runner" technique for processing thermosets will become very popular with many molders, particularly those who are currently utilizing multi-cavity molds and discarding sprue and runner systems that are 20-50 percent of the total shot size. Warm runner molding is also sometimes referred to as "cold runner," "hot manifold," or "runnerless" molding.

In the standard mold for injection molding of thermosets, the material in the sprue and runner system is cured along with the parts, and is discarded when the entire molding is discharged from the mold. In a warm runner mold, the material in the sprue and a major portion of the runner system is maintained at a temperature where it will flow but not cure by locating the sprue and runner system in a separate insulated portion of the mold. Thus, when cured parts are removed from the mold, the material in the sprue and runner becomes part of the next molding instead of being discarded.

The drawing shows a cross-sectional view, with self-explanatory legends, of a typical warm runner mold.

As can be seen, the runner, sprue, and nozzles are separated from the hot portion of the mold by a piece of insulation (e.g., transite) and are surrounded by water channels that maintain the manifold and nozzle temperatures at approximately 90°-110° C. With efficient temperature control of these regions, molding material actually remains fluid $\frac{3}{8}$ inch or less away from another region in the mold where parts are curing at mold temperatures up to 205° C.

From the above discussion, the most obvious advantage to the use of the warm runner molding method is the savings in molding material which is not discarded, but rather is effectively used. However, additional advantages can be obtained by this invention such as better dimensional control, improved cycles, and a higher degree of automation.

The characteristics of the molding material used in a warm runner mold are critical. The compound must have exceptional "life;" that is, it must lose flow at a very slow rate when held at the elevated manifold temperature. At the same time, once it enters the mold, which is significantly higher in temperature, the material must cure as rapidly as possible.

In the injection molding process, granular molding compound is poured directly into the hopper of the injection machine. The screw then rotates and moves rearward, drawing material in from the hopper and, at the same time, plasticating it to a soft putty-like mass. When the required weight of material has been plasticized the screw stops rotating and then moves forward acting as a ram and forcing the molding compound through the sprue, runners, and gates into the mold cavities. After the required cure time, the mold opens, discharging the finished parts, and the cycle begins again.

Most thermoplastic injection machines can be converted for the molding of thermosets by the installation of a new screw and barrel (plasticizing unit) especially designed for these materials. The screw length-to-diameter ratio for thermosets is normally 14:1 and smaller than the 20:1 to 24:1 for thermoplastics. The compression ratio (compression volume between flights of screw between feed end and injection end) is normally 1:1 for thermosets as compared to approximately 2½:1 for thermoplastics.

With thermoplastics, the cylinder is heated to about 200° to about 320° C. Temperature control on the mold is in the range of about 35° to about 95° C. With thermosets, the barrel temperature is normally in the range of about 60° to about 110° C. Mold temperatures are about 150° to about 205° C.

Screw speed in rpm (revolutions per minute) is an important factor in proper plasticization of the material passing over the flights. Faster screw speed results in shorter plasticizing time for a given shot. Thermosets are usually processed with a screw speed between 50 and 75 rpm. which is lower than the 90 to 220 rpm. normally used for thermoplastic.

Screw back pressure is pressure developed on the material as the screw moves rearward against applied hydraulic resistance during the plasticizing step. This hydraulic resistance is controlled by the back pressure injection cylinder flow valve, and normal plasticizing pressures range from 400–3,000 psi. in the material.

DISCUSSION OF THE INVENTION

The resins of this invention are produced by reacting about 2 to about 3.75 moles of formaldehyde with one mole of Bis-A. Though the reaction of formaldehyde with bis-A is described in the literature:
[See the following U.S. Pat. Nos.: 1,225,748; 1,614,172; 1,637,512; 1,873,849; 1,933,124; 1,948,469; 1,970,912; 2,017,877; 2,031,557; 2,050,366; 2,059,526; 2,070,148; 2,079,210; 2,079,606; 2,169,361; 2,279,526; 2,389,078; 2,464,207; 2,522,569; 2,621,164; 2,623,891; 2,667,466; 2,854,415; 3,000,847; 3,024,285; 3,080,331; 3,159,597; 3,211,652; 3,264,266; 3,390,128; 3,586,735; and 3,644,269]—there is no description of a resin possessing all of the above properties when properly compounded. Many have described novolak (2-step) resins from these reactants. Such reaction products have been suggested as tackifiers in adhesives. The resole (1-step) resins described by others are mainly recommended for varnish applications. None have suggested the reaction of these two reactants in the manner described herein whereby to produce the unique resins of this invention.

It has been determined that the reaction between formaldehyde and bisphenol-A should be carried out by mixing them with a catalytic amount of an alkali metal or barium hydroxide or oxide catalyst. The alkali metal hydroxide or barium hydroxide catalyst is employed in a catalytic amount such that the reaction mixture has a pH of from about 8 to about 10. To yield a pH within this range, it has been found that the alkali metal hydroxide or barium hydroxide catalyst should be employed in amounts from about 0.005 to about 0.2 equivalents of hydroxyl, i.e., $OH^-$, per mole of bisphenol-A. The resin is thereafter treated with an acid to reduce the pH of the resin solution below about 8, desirably between about 3 to about 8, and preferably between 4 and 5. The preferred acids are the mineral acids, such as sulfuric, phosphoric, phosphorous acids, and the like, and carboxylic acids such as lactic acid, citric acid, acetic acid, trichloroacetic acid, monochloroacetic acid, oxalic acid, and the like. The most preferred acids for neutralization are phosphoric acid, sulfuric acid, lactic acid and citric acid.

The initial mixture of the bis-A formaldehyde is achieved at a temperature below rapid condensation and the mixture is brought to condensation temperature, with stirring. Usually, the reaction temperature is at least 80° C., preferably the reaction is carried out at about 90° - 100° C., although slightly lower temperatures, e.g., down to about 70° C., can be used in some cases, especially when higher proportions of catalyst are used. Preferably, temperature is controlled by operating the reaction under reflux and reduced or atmospheric pressure may be employed. The reaction is continued until the desired degree of reaction is achieved; this can range from about 30 minutes to one hour, or longer. Generally, the degree of reaction is predicated upon the polydispersity sought.

Once the reaction is completed, the product is cooled, neutralized with acid (when this is needed), and then stripped, with heat and reduced pressure, of water and unreacted materials. These are conventional practices in the art.

In some instances, one may find that the stripped resin contains unreacted formaldehyde. If the quantity of unreacted formaldehyde creates an obnoxious odor problem during the molding of the resin, then it may prove desirable to add a formaldehyde scavenger to the resin, during its manufacture, before or after stripping or as part of the molding material formulation. The scavenger is any compound capable of reacting with formaldehyde such as amides, amines and alcohols; illustrated by melamine, urea, n-butanol, sec-butanol, n-hexanol, polyvinyl alcohol, ethylene glycol, glycerine, and the like. The amount of scavenger employed may range from 0 to 25 weight percent, based on the weight of the resin, and is mostly dependent upon the amount of free formaldehyde present. However, in most cases it is desirable not to employ more than about 15 weight percent of the scavenger based upon the weight of the resin.

The resin produced will usually have a viscosity of not more than about 30 centistokes at 25° C., determined as a 35 weight percent solution in ethanol. A viscosity of 7–15 centistokes at 25° C. is frequently preferred for most compounding and molding operations. However, these viscosities are not critical to the practice of this invention.

The resins of this invention are characterized by a relatively narrow molecular weight distribution and low molecular weight. For example, the "polydispersity" of these resins is low, ranging from about 1.5, or slightly lower, to about 5, or slightly higher. Most typically, the "polydispersity" is about 1.7 to about 3. "Polydispersity" is the ratio of the weight average molecular weight to the number average molecular weight. The resin is typically a mixture of dimers, trimers and tetramers as the prevalent components and contains a methylol content capable of condensing during the curing reaction.

As is typical with thermosetting resins, they are compounded with reinforcing materials to enhance the physical strength properties referred to above. The filler materials may be in the form of non-fibrous particles and fibrous particles. They may be inorganic or organic, and they may range from materials such as cotton fibers or fabrics to glass fibers, from asbestos to wood flour, from silica filler to hydrated alumina, from sisal to ground nut shells (e.g., walnut), from carbon fibers to zirconium or boron fibers, from polypropylene fibers to polyvinyl alcohol fibers, and the like.

For example, boron fibers are used in amounts up to about 50 weight percent of the molding compound.

They are lightweight and strength imparting fibers. Carbon and graphite fibers are used in amounts up to about 50 weight percent to provide high mechanical strength retained at high temperatues. Asbestos, either of the chrysotile, anthophylite, crocidolite, tremolite or octinolite varieties, is a fibrous filler which is employed in amounts of from about 5 to about 50 weight percent, basis weight of molding compound, to impart strength improvement and heat-resistance. Alumina and zirconium oxide fibrous fillers are used in amounts up to about 60 weight percent to provide enhanced physical properties, a high strength to weight ratio, and resistance to elevated temperature. Glass fibers are particularly desirable, in amounts of from about 30 to about 45 weight percent, to provide high strength and resistance to water, alcohols and other chemicals. Polyvinyl alcohol fibers are uniquely desirable in the molding compositions of this invention in amounts of from about 10 to about 50 weight percent to provide exceptionally high impact strengths. Shredded cotton is desirable, particularly if the molding compound is used in applications which do not require notched Izod impact strengths greater than about 0.45.

Particulate fillers, of the pigmentary and non-pigmentary (i.e., does or does not provide color) types, are most desirable and range from sand, quartz, tripoli silica, diatomaceous earth, aluminum silicates (e.g., clays), mica, talc (magnesium silicate), altered novaculite, fumed colloidal silica, nepheline syenite, wollastonite (calcium silicate), glass spheres, kaolin clay, calcium carbonate, zinc oxide, aluminum oxide, magnesium oxide, titanium dioxide, beryllium oxide, barium sulfate, wood flour, shell flour, boron carbide, hollow carbon Microballoons TM, hollow phenolic resin Microballoons TM. Such kinds of fillers are used in amounts as low as 2 weight percent up to about 70 weight percent, based on the weight of the molding compound. Frequently, mixtures of such fillers are used to impart special properties such as molding material flow, electrical properties in the molded resin, strength properties, impact resistance, and the like.

In this regard, reference is made to SPE Journal, Volume 28, No. 6, June 1972, pages 21–36, inclusive, published by the Society of Plastics Engineers, Inc., Greenwich, Connecticut, U.S.A. The SPE Journal article also discusses a wide variety of other additives, many of which may be used in the practice of this invention, such as antioxidants, colorants, optical brighteners, lubricants and ultraviolet light absorbers. Processing and molding aids, such as lubricants (e.g., stearic acid) may be added to the resin prior to formulation into a molding compound, and/or they may be added during the compounding of the resin to form the molding compound, and/or they may be added to both the resin per se and the molding compound.

An optional aid which may be added during the compounding step to make the molding compound is calcium oxide and/or calcium hydroxide. It serves the function of enhancing the hot rigidity characteristics of the compound. Calcium oxide or hydroxide may be added in amounts up to 11 weight percent, preferably about 2–7 weight percent, based on the weight of the compound.

The combinations suitable for effective molding compounds pursuant to this invention are innumerable and desirable compounded compositions are depicted in the designated examples below.

Compounding is effected in the usual manner except that certain obvious factors should be considered. If the object is to produce a light colored molded article, then the reinforcing components should be light colored and should not add undesired color upon curing of the molding material. If the molding material is to be employed in injection molding operations, then the viscosity of the resin compound should be appropriate at the molding conditions to achieve the desired flow.

If the molding material is for use in transfer or injection molding operations, then it is desirable that the compound have flows of at least 15 inches, and typically not greater than 45 inches, determined by the following procedure: the molding behavior of thermosetting resin composites is characterized by a flow test similar to that described by K. R. Hoffman and E. R. Fiala in paper XXIV-2 from the Annual Technical Conference of the Society of Plastics Engineers, Vol. 12, 1966 entitled "A Simple Ram Following Apparatus Applied to Spiral Flow Of Plastic Molding Compounds" with the following modifications: (a) the cross-section of the flow channel is 0.125 × 0.375 inch; (b) the molding material is charged to the apparatus as a preform preheated to 121° C.; (c) a mold temperature of 168° C. is used and (d) the transfer pressure is 8,800 psi on the ram. For the purpose of this invention, the "moldability" of a thermosetting compound is characterized by the number of inches the material is capable of flowing within the mold channel before setting up under the conditions of this test. It has been empirically established that good performance in injection molding requires a test flow equal to or greater than 24 inches, and good transfer molding requires a test flow equal to or greater than 18 inches in this test. Materials having spiral test flows below 15 inches are generally suitable only for the less demanding compression molding techniques.

A desirable attribute of the molding materials of this invention is the fact that they may be kept at flow temperatures, e.g., about 90° C. to about 125° C., in the mold barrel and runners for long periods of time, e.g., 1 hour or more, without being cured, yet when brought to cure temperature, e.g., about 175° C., they rapidly cure to a rigid product, essentially free of deformation and mold shrinkage, at least 30 percent faster than a comparable "one-step" phenol-formaldehyde resin molding material similarly compounded.

Compounding may be effected in a variety of equipment, such as a Banbury mixer, an extruder, a kneader, a two or three roll mill, and the like. It is important in the practice of this invention that the components of the molding compound be intimately and thoroughly dispersed such that any portion thereof has essentially the composition of any other portion thereof.

One aspect of the resin of this invention appears to be an anomoly to the excellent hot ridigity properties of the products molded from the molding materials of this invention. The resin of this invention provides a molding material which appears fully cured when removed from the mold on fast cycles, possesses a high heat distortion temperature of about 130° C., and the molded resin article possesses electrical properties equivalent to those obtained from most phenolic molding materials, but if the article is post cured, it will possess superior electrical properties. This suggests that the apparently cured molded article which possesses so many excellent properties still has unreacted methylol groups which adversely affects the potential of reaching optimum electrical properties. It is believed that the post cure condenses those remaining groups and this causes the electrical properties of the article to be significantly enhanced. Post curing may be achieved at temperatures exceeding the reaction temperature of the methylol groups. Usually, it is at least about 35° C. and preferably at least 90° C. After the post cure, the molded article of the compounded resin of this invention possesses exceptionally good electrical properties, at least equal to the best obtained with molded phenol-formaldehyde resin which are comparably compounded.

The following examples are offered to illustrate this invention and are not intended for the purpose of limiting this invention. In the examples which follow, the formulation is listed prior to the procedure used in making the resin.

EXAMPLE I

| Formulation | Parts by Weight, grams |
|---|---|
| Bisphenol A | 6000 |
| Formaldehyde (40%) | 3000 |
| Sodium Hydroxide (25%) | 72 |
| Phosphoric Acid (75%) | 18 |
| Water | 18 |

Procedure

Into a reactor, equipped with a condenser, stirrer and temperature recording device there was placed 6000 grams (26.4 moles) of bisphenol A, and 3000 grams (40 moles) of 40% by weight aqueous solution of formaldehyde. The pH of the mixture was adjusted to 9.8 by the addition thereto of 72 grams (4.5 moles) of a 25% by weight aqueous solution of sodium hydroxide. The mixture was then heated to 95° C. and maintained at 95° C. for 1 hour while being stirred. The reaction mixture was then cooled to 55° C. and its pH was adjusted to 6.0 by the addition thereto of an aqueous solution prepared by admixing 18 grams of a 75% phosphoric acid solution with 18 grams of water. The contents of the reactor were then subjected to a vacuum of 28 inches (Hg) at a temperature of between 95°–100° C. and controlled to a 150° C. hot plate gel of 120 seconds. The resin was then discharged to coolers to immediately stop condensation reactions. The molding material composition made with this resin could not be cured.

EXAMPLE II

| Formulation | Parts by Weight, grams |
|---|---|
| Bisphenol A | 6000 |
| Formaldehyde (40%) | 9000 |
| Sodium Hydroxide, (25%) | 72 |
| Phosphoric Acid (75%) | 18 |
| Water | 18 |

Procedure

Into a reactor, equipped with a condenser, stirrer and temperature recording device there was placed 6000 grams (26.4 moles) of bisphenol A and 9000 grams (120 moles) of 40% by weight aqueous solution of formaldehyde. The pH of the mixture was adjusted to pH 9.5 by the addition thereto of 72 grams (4.5 moles) of a 25% by weight aqueous solution of sodium hydroxide. The mixture was then heated to 95° C. and maintained at 95° C. for one hour while being stirred. The reaction mixture was then cooled to 55° C. and its pH was adjusted to 6.5 by the addition thereto of an aqueous solution prepared by admixing 18 grams of a 75% phosphoric acid solution with 18 grams of water. The contents of the reactor were then subjected to a vacuum of 28 inches (Hg) while applying heat. At about 75° C. the viscosity of the resin became extremely high and as a result the agitator kicked out. By raising the temperature to 95° C. the agitator started but it did kick-out again because of the very high viscosity.

EXAMPLE III

| Formulation | Parts by Weight, grams |
|---|---|
| Bisphenol A | 6000 |
| Formaldehyde (40%) | 5220 |
| Barium hydroxide Monohydrate | 72 |
| Phosphoric acid (87%) | 18 |
| Water | 18 |

Procedure

Into a reactor, equipped with a condenser, stirrer and temperature recording device, there was placed 6000 grams (26.4 moles) of bisphenol A and 5220 grams (69.6 moles) of a 40% by weight aqueous solution of formaldehyde. The pH of the mixture was adjusted to 9.2 by the addition thereto of 72 grams (0.38 moles) of barium hydroxide monohydrate.

The mixture was then heated to 95° C. and maintained at 95° C. for 1 hour while being continuously stirred. The reaction mixture was then cooled to a temperature of 55° C. and its pH adjusted to 6 by the addition thereto of an aqueous solution prepared by admixing 18 grams of water with 18 grams of 87% by weight aqueous solution of phosphoric acid. The contents of the reactor were subjected to a vacuum of 27 inches (Hg) while applying heat. In the process of heating the resin to 90°–100° C., the agitator kicked-out at 70° C. because of the very high viscosity of the resin. The resin was immediately discharged to coolers and its 150° C. hot plate gel was 58 seconds.

EXAMPLE IV

| Formulation | Parts by Weight, grams |
|---|---|
| Bisphenol A | 6000 |
| Formaldehyde (40%) | 5220 |
| Potassium Hydroxide (25%) | 72 |
| Phosphoric Acid (87%) | 18 |
| Water | 18 |

Procedure

Into a reactor, equipped with a condenser, stirrer and temperature recording device, there was placed 6000 grams (26.4 moles) of bisphenol A and 5220 grams (69.60 moles) of a 40% by weight aqueous solution of formaldehyde. The pH of the mixture was adjusted to 9.3 by the addition thereto of 72 grams (0.32 moles) of 25% by weight aqueous solution of potassium hydroxide. The mixture was then heated to 95° C. and maintained at 95° C. for 1 hour while being continuously stirred. The reaction mixture was then cooled to a temperature of 55° C. and its pH adjusted to 6.0 by the addition thereto of an aqueous solution prepared by admixing 18 grams of water with 18 grams of 87% by weight aqueous solution of phosphoric acid. The contents of the reactor were subjected to a vacuum of 27 inches (Hg) at a temperature between 98° C. and 110° C.

The resin was controlled to a 150° C. hot plate gel of 110 seconds and then it was discharged to coolers.

EXAMPLE V

| Formulation | Parts by Weight, grams |
|---|---|
| Bisphenol A | 6000 |
| Formalin (40%) | 5220 |
| Sodium Hydroxide (25%) | 72 |
| Phosphoric acid | 18 |
| Water | 18 |

Procedure

Into a reactor equipped with a condenser, stirrer and temperature recording device there was placed 6,000 grams (26.4 moles) of Bis-A, and 5220 grams (69.60 moles) of 40% by weight aqueous solution of formaldehyde. The pH of the mixture was adjusted to 9.5 by the addition thereto of 72 grams (4.5 moles) of a 25% by weight aqueous solution of sodium hydroxide. The mixture was then heated to 95° C. and maintained at 95° C. for 1 hour while being stirred.

The reaction mixture was then cooled to 55° C. and its pH was adjusted to 6.5 by the addition thereto of an aqueous solution prepared by admixing 18 grams of a 75% phosphoric acid solution with 18 grams of water.

The contents of the reactor were then subjected to a vacuum of 28 inches (Hg) at a temperature between 95°–100° C. and controlled to a 150° C. hot plate gel of 190 seconds. The resin was then discharged to coolers to immediately stop the condensation reactions.

EXAMPLE VI

| Formulation | Per cent by weight |
|---|---|
| Bis-A formaldehyde resin of Example V | 45.75 |
| Zinc stearate | 3.50 |
| Behenic acid | 0.75 |
| Dibutyl phthalate | 1.00 |
| Calcium hydroxide | 2.00 |
| Asbestos (Chrysotile) | 18.50 |
| Cellulose filler | 11.25 |
| Titanium dioxide | 10.00 |
| Zinc Oxide | 7.00 |
| Stearic acid | 0.25 |

Ingredients, totaling 2500 grams, were weighed as per above formulation and blended in a mill with stone balls for fifteen minutes.

After blending for 15 minutes, a 500 gram charge of the raw mix was put on a two roll mill. The front roll was kept at 88°–95° C and the back roll was at 138°–144° C. The material then formed a sheet and was further compounded for seventy seconds on the mill. It was then taken off the rolls to cool and became rigid for grinding to a desired granulation particle size.

Then the granules were mixed with the balance of the raw mix and re-rolled in the same manner described above, cooled and ground.

It was tested for injection molding latitude and hot rigidity.

Compression molded shaker cups have been on test for steam crack resistance for more than one year. To date, the cups have shown no cracks.

Injection Molding Properties

Molding Latitude: 86 minutes
Hot Rigidity: 2⅛ inches

Listed below are the physical injection molded properties. The molding temperature was 171° C. with a 90 seconds cure time.

| | |
|---|---|
| Notched Izod Impact Strength, ft.-pounds/inch of notch (ASTM D 256) | 0.32 |
| Flexural Strength, psi. (ASTM D 790) | 10,500 |
| Modulus of Elasticity, psi. (ASTM D 790) | $0.95 \times 10^6$ |
| Flexural Work to Break, ft-lbs/in$^2$ (Astm D 790) | 0.37 |
| Maximum Deflection, inches (ASTM D 790) | 0.144 |
| Tensile Strength, psi (ASTM D 651) | 8170 |
| Compressive Strength, psi (ASTM D 695) | 26,200 |
| Rockwell Hardness "E" (ASTM D 785) | 29 |
| Heat Distortion Temperature (ASTM D 648) | 203° C. |
| Water Absorption (ASTM D 570) | 0.89% |

EXAMPLE VII

Repeating the procedure of Example VI, a molding material from the following ingredients was made.

| Formulation | Per cent |
|---|---|
| Bis-A formaldehyde resin of Example V | 50.00 |
| Melamine | 10.00 |
| Calcium Hydroxide | 4.50 |
| Calcium Stearate | 3.00 |
| Asbestos | 18.00 |
| Pulp Flock | 6.00 |
| Nigrosine | 1.50 |
| Clay | 7.00 |
| | 100.00 |

The resulting molding material had a flow of 18.25 inches, measured at 168° C, according to the flow procedure described at page 18 supra. The molding material was transfer molded to produce ASTM specimens which were cured for two minutes at a mold temperature of 168°–171° C. As shown in the table which follows the specimens were post-baked for eight hours at 177° C and the post-baked or post-cured specimens were compared against the first cured specimens as recited in the table.

TABLE

| | ASTM Method | As Molded | Postbaked* |
|---|---|---|---|
| Flexural Strength, psi | (D 790) | 10,100 | 12,100 |
| Tensile Strength, psi | (D 651) | 7,140 | 6,710 |
| Compressive Strength psi | (D 695) | 26,900 | 28,800 |
| Izod Impact, (ft-lbs/inch of notch) | (D 256) | 330 | .320 |
| Heat Distortion Temperature, °F | (D 648) | 450 | 490 |
| Specific Gravity | (D 792) | 1.46 | 1.43 |
| Rockwell Hardness "E" | (D 785) | 69 | 80 |
| Dielectric Strength, S/T, volts/mil | (D 149) | 395 | 406 |
| Arc Resistance, sec. | (D 495) | 173 | 184 |
| Volume Resistivity, ohm cm | (D 257) | $9.3 \times 10^{12}$ | $2.9 \times 10^{12}$ |
| Dielectric Constant | (D 150) | | |
| 60 cycles | | 10.1 | 5.5 |
| 1 KC | | 8.1 | 5.2 |
| 1 MC | | 5.7 | 4.5 |
| Dissipation Factor | (D 150) | | |
| 60 cycles | | 0.18 | 0.04 |
| 1 KC | | 0.11 | 0.04 |
| 1 MC | | 0.07 | 0.03 |

*8 hrs. at 177° C.

In the table below is a comparison of the effects of the use of short poly(vinyl alcohol) fibers (PV-OH), wood flour, pulp flock and asbestos floats as impact reinforcement for the bisphenol A-formaldehyde resin of Example V. The fibers and fillers used are listed below together with the impact properties of compression molded composites:

TABLE

| Filler System, Wt. % | Composites | | |
|---|---|---|---|
| | A | B | C |
| Woodflour | — | — | 23 |
| Pulp flock | — | 8 | — |
| Asbestos floats | — | 30 | — |
| PV-OH fibers (1/25", 6 denier) | 20 | — | — |
| Notched Izod Impact Strength, ft-lbs/in. | 1.6 | 0.35 | 0.25 |
| Ball-Drop Impact Strength, in. | 40 | 15 | 14 |

In the preceding, molding latitude was determined by placing the molding material in the barrel of a reciprocating screw injection machine while in the plasticized state and subjecting it to a series of increasing delay times between injections following the plasticizing step. The maximum delay time it will still allow bottoming of the screw within the barrel within a 30 second period is reported as the injection molding latitude in terms of the barrel residence time. Hot rigidity is determined by taking a molded test sample and promptly placing it horizontally upon a vertical rod and the deflection of the part so positioned is measured. The injection mold hot rigidity is reported as deflection in inches of the part from the horizontal. The steam crack resistance is measured by placing a compression molded shaker cup (7 × 3 diameter × 1/4 inches in thickness, molded at 165°–177° C. with a cure time of 60–120 seconds and conditioned for 72 hours at 22° C., at 50% relative humidity) over a steam jet with cool air flow on the outside surface so that the steam contacts the interior of the cup. The steam crack resistance is measured as that period of time up to and including the formation of visible cracks in the cup.

EXAMPLE IX

By procedures analogous to that described in Example I, bisphenol-A/formaldehyde resins were made from the formulations shown below in the Table, using the reaction conditions indicated therein:

Table

| Component and Reaction Conditions | Run No. | | |
|---|---|---|---|
| | 1 | 2 | 3 |
| Grams Bisphenol-A | 6000 | 6000 | 6000 |
| Grams of 40% Formaldehyde | 4200 | 4200 | 4200 |
| Grams of 25% NaOH | 720 | 14.4[1] | 27 |
| Equivalents of OH$^{(-)}$ per mole Bisphenol-A | 0.171 | 0.00342 | 0.0064 |
| Grams Phosphoric Acid | 300 | — | — |
| Grams Water | 300 | — | — |
| Stearic acid, grams | 240 | 240 | — |
| Reaction temp., ° C. | 70° | 97°–104° | 95° |
| Reaction time | 30 min. | 12+ hrs. | 3 hrs. |
| 150° Gel time, Seconds | 238 | 850 | 250 |
| Yield, grams | 7947 | 6970 | 7802 |
| Methylol content, wt. % | 17.97 | 8.73 | 14.44 |
| Reaction pH | 10.1 | 8.3 | 8.3 |
| Final pH | 6 | 3 | 4.3 |

[1]Added in two portions of 7.2 grams each. pH prior to second portion was 4.5.

A satisfactory molding material was made using the resin from Run No. 1. The proportion of catalyst used in Run No. 1 is about the upper limit for the particular formulation used.

The resin from Run No. 2 was too unreactive to be used.

The proportion of catalyst in Run No. 3 is slightly above the lower limit that can be used.

The reason that the proportion of catalyst employed in Run No. 1 is about the upper limit that should be employed is that:

(a) the resin will contain a relatively large amount of salt (from the neutralized catalyst), which will have a detrimental effect on steam crack resistance and electrical properties;

(b) the reaction mixture employed in making the resin was close to the limit in reactivity for convenient handling; and (c) because of the high reactivity of the resin, it is difficult to remove enough water to prevent a severe tendency to sinter.

What is claimed is:

1. A process for producing a one-step, heat convertible resinous reaction product of formaldehyde and 2,2-bis(4-hydroxyphenyl)propane, said reaction product having a viscosity of not more than about 30 centistokes measured at 25° C. as a 35 weight per cent solution in ethanol, and a polydispersity of from about 1.5 to about 5, and said product being suitable for use in molding compounds, wherein said process comprises the steps of:

(a) reacting formaldehyde with 2,2-bis(4-hydroxyphenyl)propane in proportions of from about 2 to about 3.75 moles of formaldehyde per mole of 2,2-bis(4-hydroxyphenyl)propane, at an elevated temperature of at least about 70° C., in the presence of a catalytic quantity of an alkali metal or barium oxide or hydroxide condensation catalyst, for a period of time sufficient to produce a resinous reaction product having a predetermined degree of polydispersity;

(b) cooling and neutralizing said reaction product to a pH of from about 3 to about 8; and (c) recovering said reaction product.

2. The product produced by the process of claim 1.

3. A molding material possessing excellent molding latitude with low degree of mold shrinkage, high modulus at elevated temperatures, a low degree of deformation at elevated temperatures, and excellent steam crack resistance and electrical properties, which comprises about 20 to about 70 weight percent, based on the weight of the molding material, of a resinous reaction product, and about 30 to about 80 weight percent, based on the weight of the molding material, of a reinforcing filler for said resinous reaction product, wherein said resinous reaction product comprises the product of claim 2.

4. The process of claim 1 wherein the reaction temperature of step (a) is at least 80° C.

* * * * *